United States Patent Office 3,012,311
Patented Dec. 12, 1961

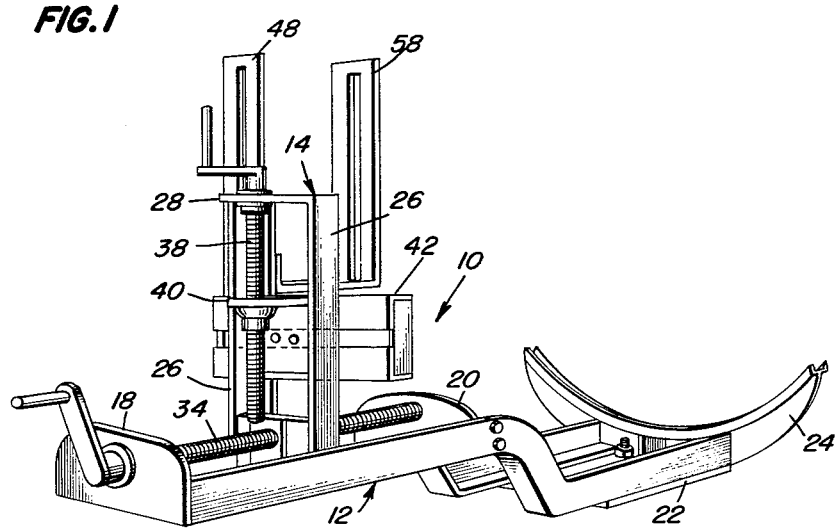
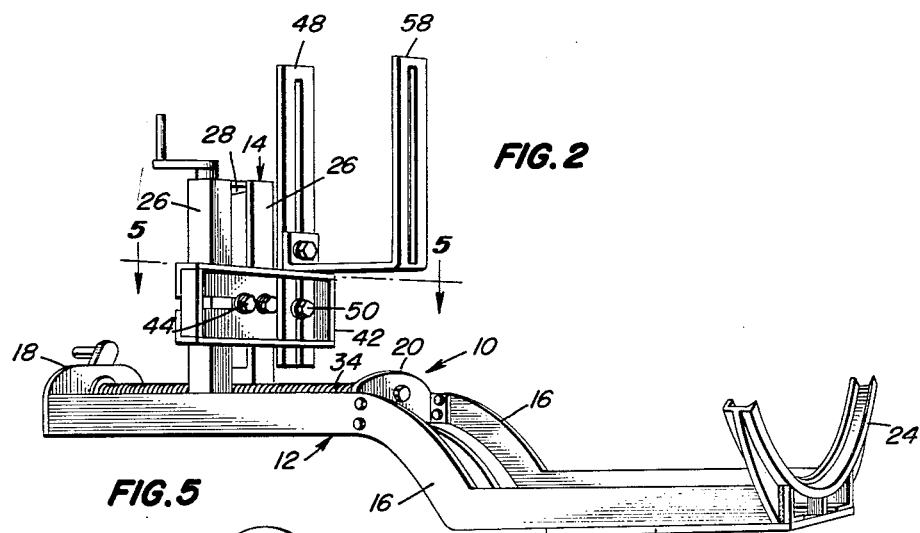
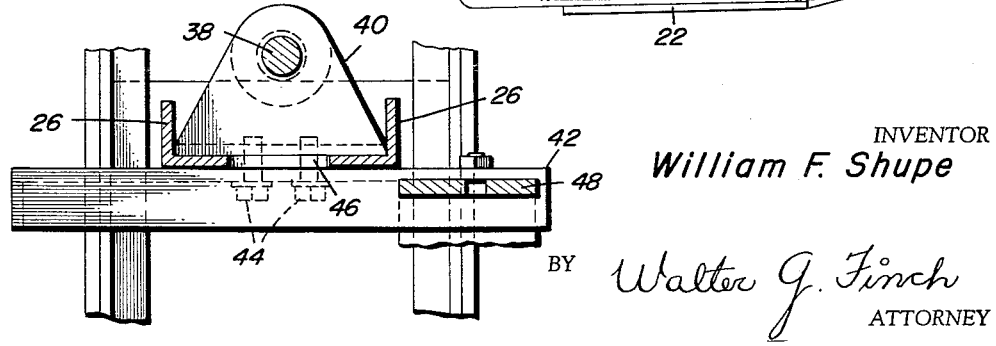

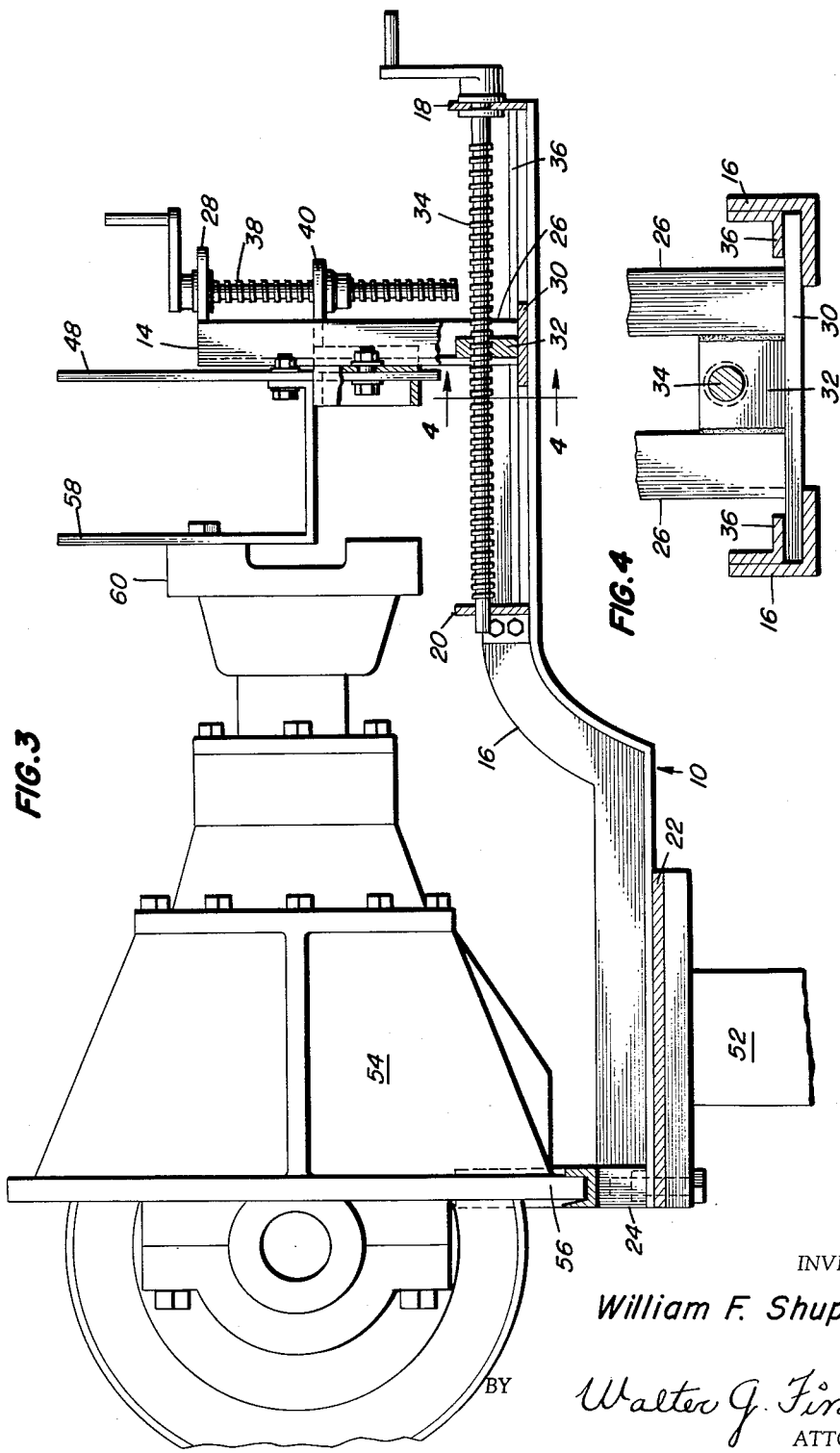

3,012,311
DIFFERENTIAL REMOVAL FIXTURE ARRANGEMENT
William F. Shupe, 2962 Harford Road, Baltimore, Md., assignor of twenty-five percent to Molly Hash, Baltimore, Md.
Filed July 27, 1959, Ser. No. 829,626
2 Claims. (Cl. 29—200)

This invention relates generally to supports or racks, and, more particularly, it pertains to an adjustable fixture for removing and handling automotive differential gear boxes.

In the automobile and truck repair and maintenance business, one of the most difficult, time-consuming, and dangerous operations is the removal and installation of the differential gear box. With the automobile wheels removed and makeshift support blocking or jacking employed, the repairman is exposed to grave danger while working beneath the automobile to free the differential gear box. Since differential gear boxes may weigh from three hundred to four hundred pounds in many cases, even the disconnected gear box is awkward to handle.

It is, therefore, an object of the present invention to provide a handling rack fixture which is readily adapted for the installation and removal of all sizes and types of automotive differential gear boxes.

Another object of this invention is to provide an attachment for automobile differential jacks which cradles and supports the differential gear box for easy removal and installation thereof.

Still other objects of this invention are to provide a manipulation fixture for breaking loose and aligning differential gear boxes to automotive structure, and which are versatile, compact, easily manipulated, readily and economically manufactured for the repair trade.

Other objects and advantages of this invention which are not particularly enumerated above will become apparent after a consideration of the following detailed description and accompanying drawings in which:

FIG. 1 is a perspective view of a differential handling fixture incorporating the features of this invention;

FIG. 2 is a perspective view of the differential handling fixture of FIG. 1 taken from a different direction;

FIG. 3 is a side elevation of the differential handling fixture depicting in cross-section the details and method of use of the differential handling fixture;

FIG. 4 is a cross-section taken along line 4—4 of FIG. 3; and

FIG. 5 is a cross-section taken along line 5—5 of FIG. 2.

Referring now to FIGS. 1 and 2 of the drawings, a handling fixture is illustrated generally by reference numeral 10. Fixture 10 consists of a main frame 12 having a substantially vertically arranged traveling frame 14 slidable thereon. A pair of structural angle side pieces 16 are bent offset as shown to make up the frame 12, and are spaced apart and secured by an end plate 18, a a center plate 20, and a horizontal jack plate 22. A transverse, semi-circular, grooved cradle 24 is secured to the end of the frame 12 adjacent to the jack plate 22.

The vertically arranged traveling frame 14 consists of a pair of structural angle vertical sides 26 which are parallel spaced and secured by a top plate 28 and a foot plate 30, the latter being best illustrated in FIGS. 3 and 4.

A nut plate 32, also shown in FIGS. 3 and 4, is welded to the lower ends of the vertical sides 26 and adjacent to the foot plate 30. It is threaded to receive a crankscrew 34, shown in FIGS. 1 to 5, which has a handle at one end, and which is pivoted at its ends within the end and center plates 18 and 20. By rotating the crankscrew 34 by means of the handle, the traveling frame 14 is caused to move therebetween. A pair of guides 36, shown in FIGS. 3 and 4, is welded to the side pieces 16 to captivate the foot plate 30 yet allowing free horizontal motion thereof.

A vertical crankscrew 38, also having a handle provided at one end thereof, is pivotally mounted and secured against end thrust in the top plate 28, as shown in FIGS. 1, 2, 3, and 5. This crankscrew 38 is threaded into and arranged to vertically raise and lower a footed nut plate 40, as shown in FIGS. 1 and 3.

As shown in FIGS. 1 and 5, the nut plate 40 travels within the confines of spaced vertical sides 26. A boxlike horizontal carriage 42, slotted for adjustment, is bolted to the nut plate 32 by means of headed bolts 44 and to an intervening spacer plate 46, as shown in FIG. 5. Plate 46 is of slightly greater thickness than the material of sides 26 and slides freely therebetween. By loosening the bolts 44, the carriage 42 may be positioned endwise, as desired.

The carriage 42 is pierced at one or both sides to receive a slotted vertical slide 48, as shown best in FIGS. 3 and 5. A single headed and nutted bolt 50, as shown in FIG. 2, permits vertical positioning and securement of slide 48 upon either end of carriage 42.

In use, the plate 22 of the handling fixture 10 is bolted to a conventional automobile differential jack 52, as best shown in FIG. 3, and positioned beneath the automobile or truck, which is not shown. The grooved cradle 24 is arranged so as to engage with the circular flange 56 which is part of a typical gear box 54. The traveling frame 14 is then moved horizontally by means of the handle of the crankscrew 34 until a slotted auxiliary bracket 58, which is bolted to the vertical slide 48, bears against the end of an uncoupled universal joint flange 60, which is part of the differential gear box 54, and then bolted thereto.

By turning the handle of the crankscrew 38, the universal joint end of gearbox 54 may be caused to be tilted up or down to break loose any binding in the removal operation or to align bolt holes, or the like, in an installation operation.

Positioned as it is upon the handling fixture 10 and jack 52, the differential gear box 54 may be jacked down and removed for ready servicing and maintenance thereof. Even when the fixture 10 is removed from the jack 52, a useful function is performed by the jack plate 22 which provides a flat surface support on a bench or floor for the awkward shape and weight of the gearbox 54.

Obviously, many other modifications and variations of the present invention are possible in the light of the above teachings. It is, therefore, to be understood that within the scope of the appended claims the invention may be practiced otherwise than as specifically described.

What is claimed is:

1. an adjustable fixture for removing, positioning and handling automotive differential gear boxes, comprising, means including a main frame having a pair of parallel spaced tracks at one end thereof, the opposite end of said frame being offset downwardly from said parallel spaced tracks but parallel thereto, said main frame having a horizontally arranged plate located below said opposite end but secured thereto for support on an adjacent structure with a cradle secured centrally to said opposite end of said main frame but thereabove for receiving a flange of a differential gear box, means including a horizontally traveling vertically arranged frame slidably mounted in said parallel spaced tracks of said main frame, means for moving said horizontally traveling vertically arranged frame horizontally in said parallel spaced tracks of said main frame toward as well as away from said cradle, means including a vertically as well as horizontally adjustable frame mechanically connected to said traveling vertically arranged frame and having an arm for connecting to one end of an uncoupled universal joint flange of said differential gear box, and means for moving said vertically as well as horizontally adjustable frame upwardly and downwardly in said horizontally traveling vertically arranged frame, whereby when said flange of said differential gear box is positioned in said cradle and said arm is connected to the uncoupled universal joint flange of said differential gear box, said differential gear box can be removed as well as positioned to an automobile with facility and ease.

2. An adjustable fixture for removing, positioning, and handling automotive differential gear boxes, comprising, a main frame having a pair of parallel spaced tracks at one end thereof, the opposite end of said frame being offset downwardly from said parallel spaced tracks but parallel thereto, said main frame having a horizontally arranged jack plate secured below said opposite end of said main frame but secured thereto for support on an adjacent structure, together with a cradle secured above and centrally to said opposite end of said frame for receiving a flange of a differential gear box, a horizontally traveling vertically arranged frame slidably mounted in said parallel spaced tracks of said main frame, screw drive means for moving said horizontally traveling vertically arranged frame horizontally in said parallel spaced tracks of said main frame, a movable frame mechanically connected to said horizontally traveling vertically arranged frame and having an arm for connecting to one end of an uncoupled universal joint flange of said differential gear box, and other screw drive means for moving said movable frame upwardly and downwardly in said horizontally traveling vertically arranged frame, whereby when said flange of said differential gear box is positioned in said cradle and said arm is connected to the uncoupled end of said differential gear box, said differential gear box can be removed as well as positioned to an automobile with facility and ease.

References Cited in the file of this patent
UNITED STATES PATENTS

| | | |
|---|---|---|
| 1,996,169 | Padgett | Apr. 2, 1935 |
| 2,680,287 | Wilson | June 8, 1954 |
| 2,794,242 | Evers | June 4, 1957 |